(12) United States Patent
McNaull et al.

(10) Patent No.: US 12,208,782 B2
(45) Date of Patent: Jan. 28, 2025

(54) SYSTEMS AND METHODS FOR PRE-CALCULATING INFORMATION REGARDING INTERACTIONS BETWEEN OBJECTS DURING A SIMULATION

(71) Applicant: Disney Enterprises, Inc., Burbank, CA (US)

(72) Inventors: Patrick J McNaull, Winter Garden, FL (US); Robert J. Marra, Windermere, FL (US); Christopher C. Hofer, Ocoee, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 230 days.

(21) Appl. No.: 18/063,514

(22) Filed: Dec. 8, 2022

(65) Prior Publication Data

US 2024/0190400 A1    Jun. 13, 2024

(51) Int. Cl.
| | |
|---|---|
| *A63G 7/00* | (2006.01) |
| *A63G 31/16* | (2006.01) |
| *B60T 7/12* | (2006.01) |
| *B60W 10/18* | (2012.01) |
| *B60W 40/105* | (2012.01) |
| *B60W 40/13* | (2012.01) |

(52) U.S. Cl.
CPC ............... *B60T 7/12* (2013.01); *A63G 7/00* (2013.01); *A63G 31/16* (2013.01); *B60T 7/128* (2013.01); *B60W 10/18* (2013.01); *B60W 40/105* (2013.01); *B60W 40/13* (2013.01); *B60T 2250/02* (2013.01); *B60T 2250/04* (2013.01); *B60W 2300/44* (2013.01); *B60W 2530/10* (2013.01); *B60W 2530/18* (2013.01)

(58) Field of Classification Search
CPC .......... A63G 7/00; A63G 31/16; B60T 7/128; B60W 2300/44; B60W 2530/18
USPC ........................................................... 701/70
See application file for complete search history.

(56) References Cited

U.S. PATENT DOCUMENTS

| | | | | |
|---|---|---|---|---|
| 5,403,238 A | * | 4/1995 | Baxter ............... | A63G 31/16 472/43 |
| 5,473,990 A | * | 12/1995 | Anderson .......... | A63G 31/16 104/53 |
| 5,583,844 A | * | 12/1996 | Wolf .................. | G05B 19/425 701/1 |

(Continued)

*Primary Examiner* — Erick R Solis
(74) *Attorney, Agent, or Firm* — Foley & Lardner LLP

(57) ABSTRACT

A simulation platform may receive equipment information regarding ride equipment. The equipment information identifies a first location of a first end of the ride equipment on a travel path and identifies a second location of a second end of the ride equipment. The simulation platform may determine, based on the equipment information, that the first location is at a first distance from a starting location on the travel path and indicates that the second location is at a second distance from the starting location. The simulation platform may execute a computer model to perform a simulation of a movement of a passenger vehicle along the travel path. The simulation platform may determine, during the simulation, that the passenger vehicle is located at a particular distance from the starting location. The simulation platform may determine whether the particular distance corresponds to a location between the first location and the second location.

20 Claims, 8 Drawing Sheets

(56) References Cited

U.S. PATENT DOCUMENTS

| | | | | |
|---|---|---|---|---|
| 5,623,878 | A * | 4/1997 | Baxter | A63G 21/08 |
| | | | | 104/53 |
| 8,280,582 | B2 * | 10/2012 | Leinung | B60W 30/18072 |
| | | | | 180/197 |
| 11,834,074 | B1 * | 12/2023 | Flatland | B60W 30/182 |
| 2007/0093360 | A1 * | 4/2007 | Neff | A63B 22/0605 |
| | | | | 482/8 |
| 2007/0106484 | A1 * | 5/2007 | Sweatman | A63G 7/00 |
| | | | | 701/1 |
| 2015/0363976 | A1 * | 12/2015 | Henson | H04N 13/279 |
| | | | | 345/419 |
| 2017/0269586 | A1 * | 9/2017 | D'Andrea | G05D 1/0022 |
| 2018/0253141 | A1 * | 9/2018 | McCracken | A63G 27/00 |
| 2022/0143505 | A1 * | 5/2022 | Mathieson | G07F 17/32 |
| 2023/0058032 | A1 * | 2/2023 | Roozeboom | H04W 4/48 |

* cited by examiner

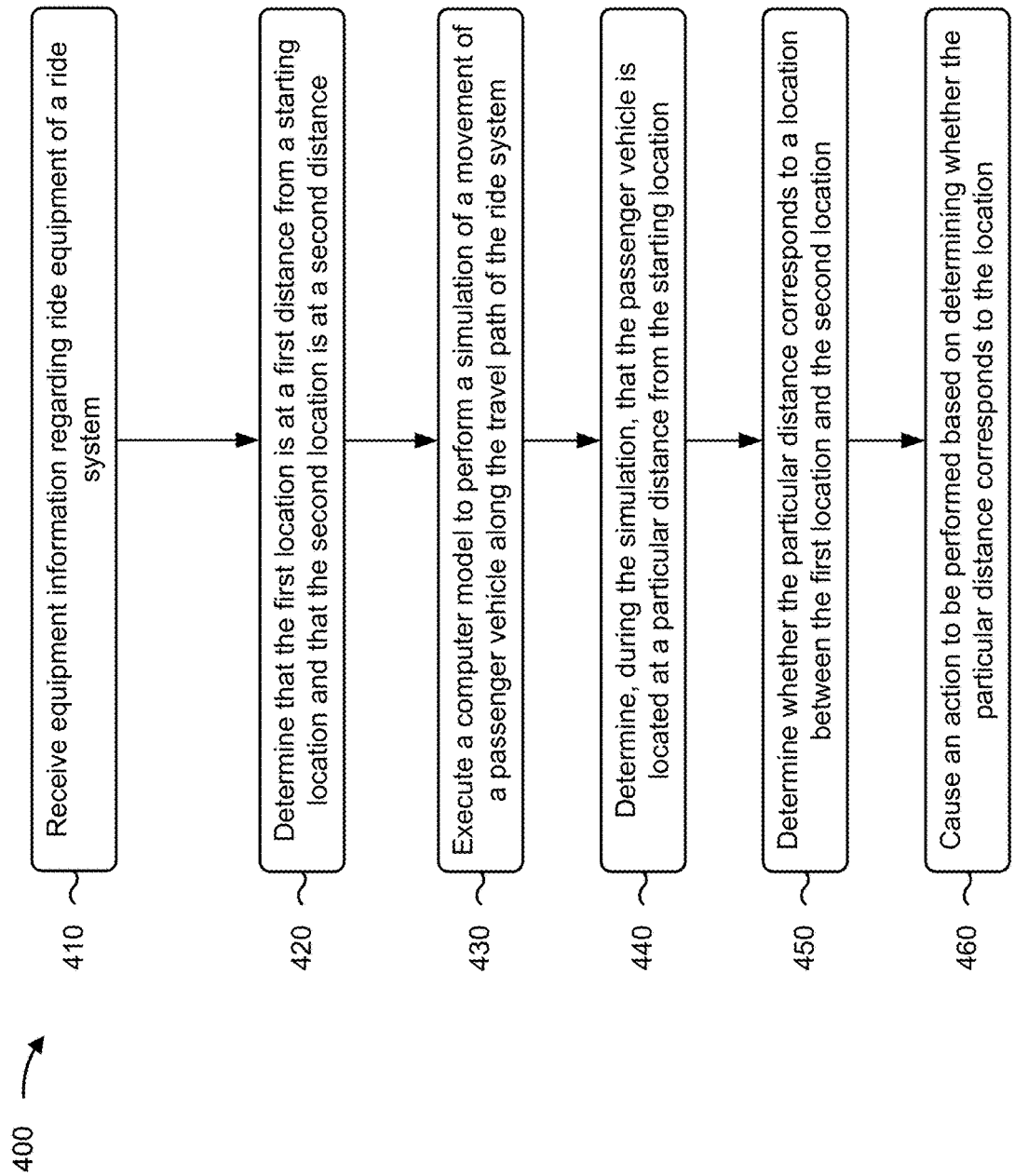

SYSTEMS AND METHODS FOR PRE-CALCULATING INFORMATION REGARDING INTERACTIONS BETWEEN OBJECTS DURING A SIMULATION

BACKGROUND

A ride system includes a passenger vehicle that transports passengers through a ride experience. Typically, the passenger vehicle includes a system or device that propels the passenger vehicle through the ride experience, from one portion of the ride system to another portion of the ride system. The passenger vehicle may interact with different objects as the passenger vehicle travels along a ride path of the ride system.

SUMMARY

In some implementations, a method performed by a simulation platform includes receiving equipment information regarding ride equipment of a ride system, wherein the equipment information identifies a first location of a first end of the ride equipment on a travel path of the ride system and identifies a second location of a second end of the ride equipment on the travel path; determining, based on the equipment information, that the first location is at a first distance from a starting location on the travel path and that the second location is at a second distance from the starting location on the travel path; executing a computer model to perform a simulation of a movement of a passenger vehicle along the travel path of the ride system; determining, during the simulation, that the passenger vehicle is located at a particular distance from the starting location on the travel path; determining whether the particular distance corresponds to a location between the first location and the second location; and causing an action to be performed, during the simulation, based on determining whether the particular distance corresponds to the location between the first location and the second location.

In some implementations, a device includes one or more processors configured to: determine a first location of a first end of ride equipment on a travel path of a ride system and a second location of a second end of the ride equipment on the travel path; determine that the first location is at a first distance from a particular position on the travel path and that the second location is at a second distance from the particular position on the travel path; execute a computer model to perform a simulation of a movement of a passenger vehicle along the travel path of the ride system; determine, during the simulation, that the passenger vehicle is located at a particular distance from the particular position after determining that the first location is at the first distance and that the second location is at the second distance; determine whether the particular distance corresponds to the first location or the second location; and cause an action to be performed, during the simulation, based on determining whether the particular distance corresponds to the first location or the second location.

In some implementations, a non-transitory computer-readable medium storing a set of instructions includes one or more instructions that, when executed by one or more processors of a device, cause the device to: determine a first location of a first end of ride equipment on a travel path of a ride system and a second location of a second end of the ride equipment on the travel path; determine that the first location is at a first distance from a particular position on the travel path and that the second location is at a second distance from the particular position on the travel path; execute a computer model to perform a simulation of a movement of a passenger vehicle along the travel path of the ride system; determine, during the simulation, that the passenger vehicle is located at a particular distance from the particular position after determining that the first location is at the first distance and that the second location is at the second distance; determine whether the particular distance corresponds to a location between the first location and the second location; and cause an action to be performed, during the simulation, based on determining whether the particular distance corresponds to the location between the first location and the second location.

BRIEF DESCRIPTION OF THE DRAWINGS

FIG. 4 is a flowchart of an example process relating to pre-calculating information regarding interactions between objects during a simulation.

DETAILED DESCRIPTION

Figure 1A:
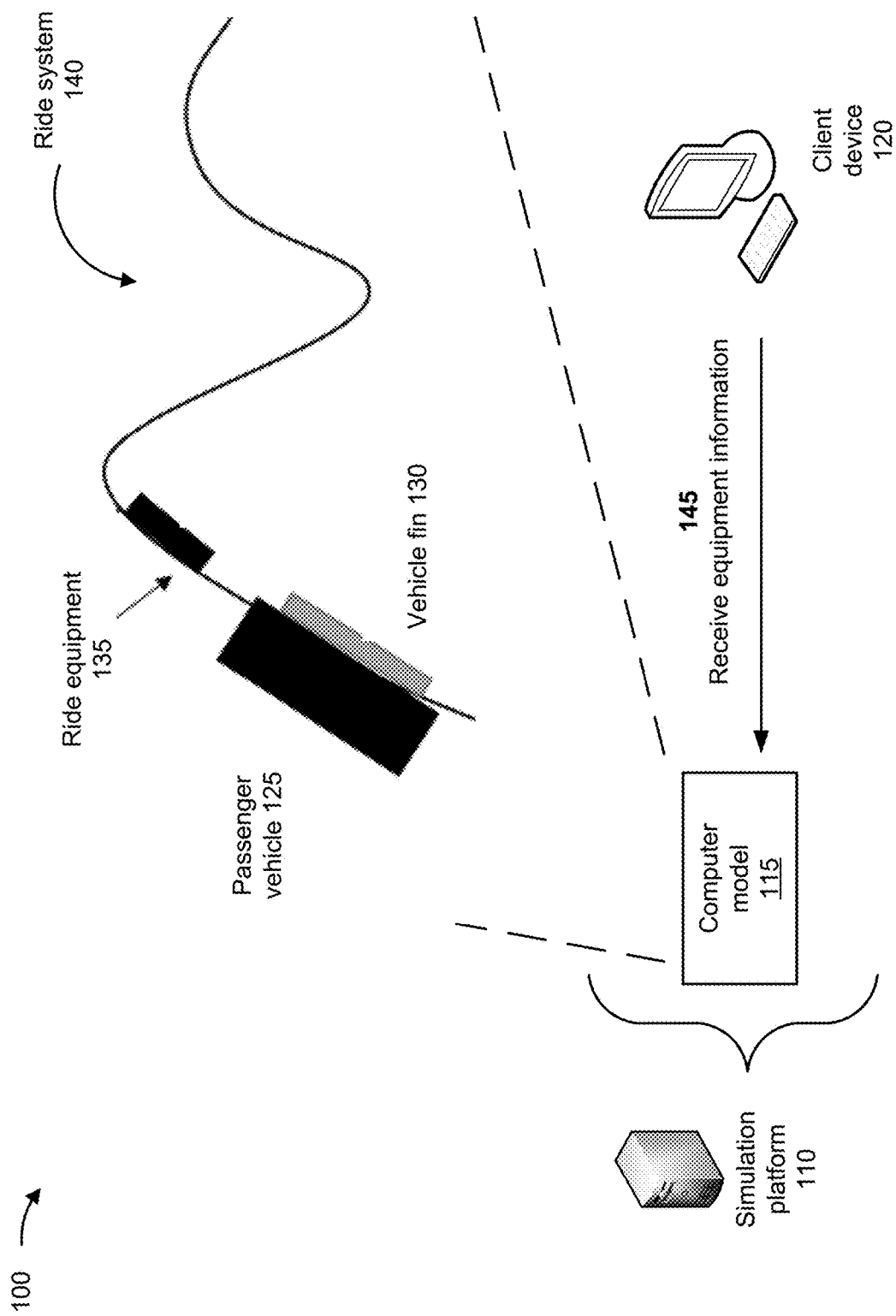
FIGS. 1A-1E are diagrams of an example implementation described herein.

The following detailed description of example implementations refers to the accompanying drawings. The same reference numbers in different drawings may identify the same or similar elements.

A simulation environment may be a programming environment, of a computer, that is dedicated to simulations of different systems. For example, the simulation environment may enable a simulation of objects. The simulation environment (and the simulation) may become more complex as a level of detail, for modeling the objects, increases. As the simulation environment becomes more complex, a speed of execution of the simulation decreases.

One particular challenge is simulating interactions between the objects. As an example, the objects may include a moving passenger vehicle of a ride system and a stationary ride equipment of the ride system. Simulating interactions between such objects is challenging because the interactions occur during the simulation and because modeling the interactions may require numerous complex computations. An example of such interactions may include an interaction between the moving passenger vehicle and a proximity sensor that can detect a presence of the passenger vehicle. The ride path may include a track and the proximity sensor may be fixed to the track.

Simulating interactions between the objects may be further complicated when the simulation involves objects moving in a three dimensional space because different complex calculations (or computations) must be performed during the simulation. The interactions, between the objects, occur when the objects are in a same location (e.g., a same latitude, a same longitude, and a same elevation). The different complex calculations include a calculation of momentum in the three dimensional space, a calculation of inertia in the three dimensional space, and/or a calculation of weight distribution in the three dimensional space, among other examples.

Three dimensional interactions and collisions have previously been calculated using a variety of techniques, such as ray casting and octrees. Video games perform these graphics-based calculations at high rates of speed and often leverage a graphics processing unit of a computer to perform these calculations in parallel. For at least the foregoing reasons, simulating interactions between the objects, as described above, causes delay during execution of the simulation.

Implementations described herein are directed to reducing delays during execution of a simulation of interactions between mobile objects and stationary objects. For example, implementations described herein may reduce the delays by pre-computing (e.g., pre-determining) equipment interaction locations prior to or at a beginning of the simulation and by converting position-based computations from a three dimensional space to a one dimensional space.

In the context of a ride system, a mobile object may include a passenger vehicle and a stationary object may include ride equipment. The ride equipment may include a sensor device (e.g., to detect a presence of the passenger vehicle) and/or braking equipment, among other examples. As used herein, an "interaction location" or an "equipment interaction location" may refer to a location where an interaction occurs between the mobile object (e.g., the passenger vehicle) and the stationary object (e.g., the ride equipment). For instance, the interaction occurs when the passenger vehicle crosses the ride equipment as the passenger vehicle travels along a ride path of the ride system.

In some examples, the interaction locations may be based on a location of the ride equipment along the ride path of the ride system. For instance, a first interaction location may correspond to a location of a first end of the ride equipment and a second interaction location may be correspond to a location of a second end of the ride equipment. Additional interaction locations may correspond to different locations of other portions of the ride equipment (e.g., portions between the first end and the second end).

Each interaction location may correspond to a different distance from a known location along the ride path of the ride system. For example, the first interaction location (e.g., corresponding to the location of the first end) may be provided at a first distance from the known location, the second interaction location (e.g., corresponding to the location of the second end) may be provided at a second distance from the known location, and so on. Information regarding the interaction locations may be stored in one or more memories Implementations described herein may determine amounts of overlap between the passenger vehicle and the ride equipment at any given location of the passenger vehicle (e.g., at any distance traveled by the passenger vehicle starting from the known location). In some examples, the amounts of overlap may be based on a length of the passenger vehicle and based on a length of the ride equipment.

As an example, when the passenger vehicle (e.g., a front end of the passenger vehicle) is located at the first end of the ride equipment, the amount of overlap may be a first amount of overlap. The first amount of overlap may correspond to a portion of the length of the ride equipment. As the passenger vehicle continues to travel towards the second end of the ride equipment, the amount of overlap may increase towards a second amount of overlap. When the passenger vehicle (e.g., the front end of the passenger vehicle) is located at the second end of the ride equipment, the amount of overlap may be the second amount of overlap. The second amount of overlap may correspond to the length of the ride equipment. Accordingly, the first end may be associated with a first amount of overlap, the second end may be associated with a second amount of overlap, and so on.

During the simulation, a location of the moving object (e.g., the passenger vehicle) may be converted to a one-dimensional distance traveled by the passenger vehicle along the ride path. As an example, the one-dimensional distance may be determined instead of determining a three dimensional location. For instance, the one-dimensional distance may be a distance from the known point (along the ride path) to a current location of the passenger vehicle. As an example, the starting location may be a load/unload station of the ride system.

The one-dimensional distance may be used to identify when a pre-computed interaction is occurring based on the pre-computed interaction locations. Because a movement of the passenger vehicle is constrained to the track of the ride path, the one-dimensional distance may be determined (instead of determining the three dimensional location of the passenger vehicle).

In some implementations, one or more pre-calculated interaction functions may provide a true value or a false value indicating whether an interaction between the passenger vehicle and the ride equipment is occurring. For example, the one or more pre-calculated interaction functions may be used to determine whether the one-dimensional distances correspond to the interaction locations (e.g., determine whether the passenger vehicle is located at the interactions locations). In some implementations, when the one or more interaction functions provide a true value, information identifying an amount of overlap between the passenger vehicle and the ride equipment may be provided (e.g., as an input to the simulation).

The amount of overlap (determined prior to the simulation as explained above) may be provided for any location of the passenger vehicle along the ride path (e.g., for any distance from the starting location). The information, identifying the amount of overlap, may be required to accurately simulate the interaction (e.g., physical interaction) between the passenger vehicle and the ride equipment. For example, the ride equipment may be a braking equipment and the amount of overlap may be used to determine an amount of force (e.g., an amount of braking force) applied by the braking equipment. The amount of force may be proportional to the amount of overlap.

By moving the complex calculations to before or at a beginning of the simulation as described herein, an execution time of the simulation may be decreased. Particularly, when using iterative analysis on a simulation, significant amounts of computation time may be preserved by moving the complex calculations to before or at a beginning of the simulation.

By reducing the three dimensional complexity down to a single dimension and moving the calculations to the beginning of the simulation, computationally expensive calculations are performed only once. Accordingly, the simulation may be executed in an expedited manner, thereby enabling studies (regarding the ride system) to be performed in an expedited manner. Implementations described herein provide a single-threaded solution during startup of the simulation which allows the simulation to be repeatable because race conditions, commonly associated with parallel processing, are removed.

FIGS. 1A-1E are diagrams of an example implementation 100 associated with pre-calculating information regarding interactions between objects during a simulation. As shown in FIGS. 1A-1E, example implementation 100 includes a simulation platform 110, a client device 120, a passenger vehicle 125 of a ride system 140, and ride equipment of ride system 140.

Simulation platform 110 may include one or more devices configured to host a simulation environment. As shown in FIG. 1A, simulation platform 110 may include a computer model 115. Computer model 115 may include a computer model that is executed to launch a simulation. For example, simulation platform 110 may be configured to execute computer model 115 to launch the simulation to simulate interactions between passenger vehicle 125 and ride equipment 135.

As shown in FIG. 1A, simulation platform 110 may include a vehicle fin 130. Vehicle fin 130 may be configured to interact with ride equipment 135. For example, vehicle fin 130 may receive an amount of force from ride equipment 135 if ride equipment 135 is braking equipment. The amount of force may reduce a velocity of passenger vehicle 125.

In some implementations, ride equipment 135 may include a sensor device configured to detect a presence of passenger vehicle 125. In this regard, the sensor device may be configured to detect the presence of passenger vehicle 125 based on an interaction between the sensor device and passenger vehicle 125. For example, the sensor device may detect the presence of passenger vehicle 125 based on an amount of overlap between the sensor device and passenger vehicle 125.

In some implementations, ride equipment 135 may include braking equipment. In this regard, the braking equipment may be configured to apply an amount of braking force on passenger vehicle 125 (e.g., apply the amount of braking force on vehicle fin 130). The braking equipment may be configured to apply the amount of braking force on passenger vehicle 125 based on an interaction between the braking equipment and passenger vehicle 125. For example, braking equipment may be configured to apply the amount of braking force based on an amount of overlap between passenger vehicle 125 and the braking equipment. The amount of braking force may be based on the amount of overlap.

Client device 120 may include one or more devices capable of capable of receiving, generating, storing, processing, and/or providing information associated with pre-calculating information regarding interactions between objects during a simulation, as described elsewhere herein. Client device 120 may be capable of receiving (e.g., from simulation platform 110) outputs of the simulation (e.g., thousands of outputs) and provide the outputs for display (e.g., to a modeler of computer model 115, to an individual associated with client device 120, among other examples). In some implementations, client device 120 may be configured to execute computer model 115 in a manner similar to a manner in which simulation platform 110 executes computer model 115.

As shown in FIG. 1A, and by reference number 145, simulation platform 110 may be configured to receive equipment information. For example, simulation platform 110 may receive the equipment information (regarding ride equipment 135) from client device 120. In some examples, simulation platform 110 may receive the equipment information from client device 120 as part of a request (from client device 120) to simulate interactions between passenger vehicle 125 and ride equipment 135. The equipment information may be provided as an input to computer model 115.

In some implementations, the equipment information may identify a type of ride equipment 135, dimensions of ride equipment 135, a location of ride equipment 135 on the ride path, among other examples. The type of ride equipment 135 may include the sensor device, the braking equipment, among other examples of ride equipment that may be provided with ride system 140. In some examples, the dimensions of ride equipment 135 may include a length of ride equipment 135, a width of ride equipment 135, and/or a height of ride equipment 135, among other examples.

In some implementations, simulation platform 110 may receive vehicle information from client device 120. The vehicle information may include dimensions of passenger vehicle 125. The dimensions of ride equipment 135 may include a length of passenger vehicle 125, a width of passenger vehicle 125, and/or a height of passenger vehicle 125, among other examples.

Figure 1B:
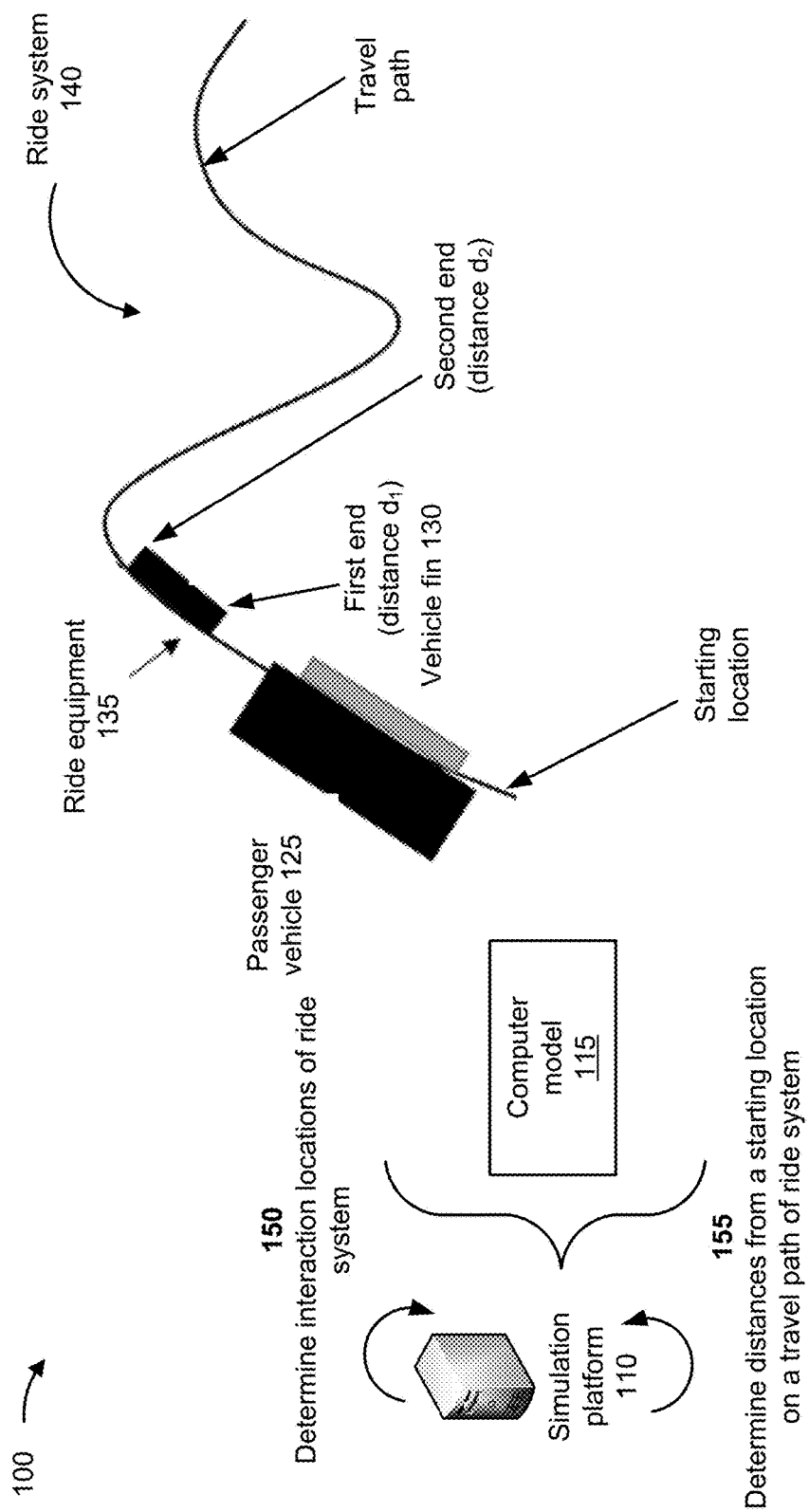

As shown in FIG. 1B, and by reference number 150, simulation platform 110 may determine interaction locations of ride system 140. In some implementations, when determining the interaction locations, simulation platform 110 may determine locations of ends of ride equipment 135. In some examples, the location of ride equipment 135 (identified in the equipment location) may correspond to a first location of a first end of ride equipment 135. Simulation platform 110 may determine a second location of a second end of ride equipment 135 based on the first location of the first end and the length of ride equipment 135. For example, simulation platform 110 may determine that the second location is a location provided at a distance from the first location. The distance may be based on the length of ride equipment 135.

The first location of the first end may be a first interaction location of ride system 140. Additionally, the second location of the second end may be a second interaction location of ride system 140. The first end may be an entry point of ride equipment 135 and the second point may be an exit point of ride equipment 135. In some implementations, the equipment information may identify the first location and the second location. In this regard, simulation platform 110 may determine the first location and the second location using the equipment information.

As shown in FIG. 1B, and by reference number 155, simulation platform 110 may determine distances from a starting location on a travel path of ride system. The starting location may be any known location along the ride path that may serve as a reference point for the purposes of determining distances. As an example, the starting location may be a load/unload station of ride system 140.

Based on the known location and the first location of the first end of ride equipment 135, simulation platform 110 may determine a first distance ($d_1$) from the known location to the first location of the first end of ride equipment 135 (e.g., the first interaction location). Similarly, based on the known location and the second location of the second end of ride equipment 135, simulation platform 110 may determine a second distance ($d_2$) from the known location to the second location of the second end of ride equipment 135 (e.g., the second interaction location). Simulation platform 110 may determine distances from the known location to different portions of ride equipment 135 in a similar manner.

Figure 1C:
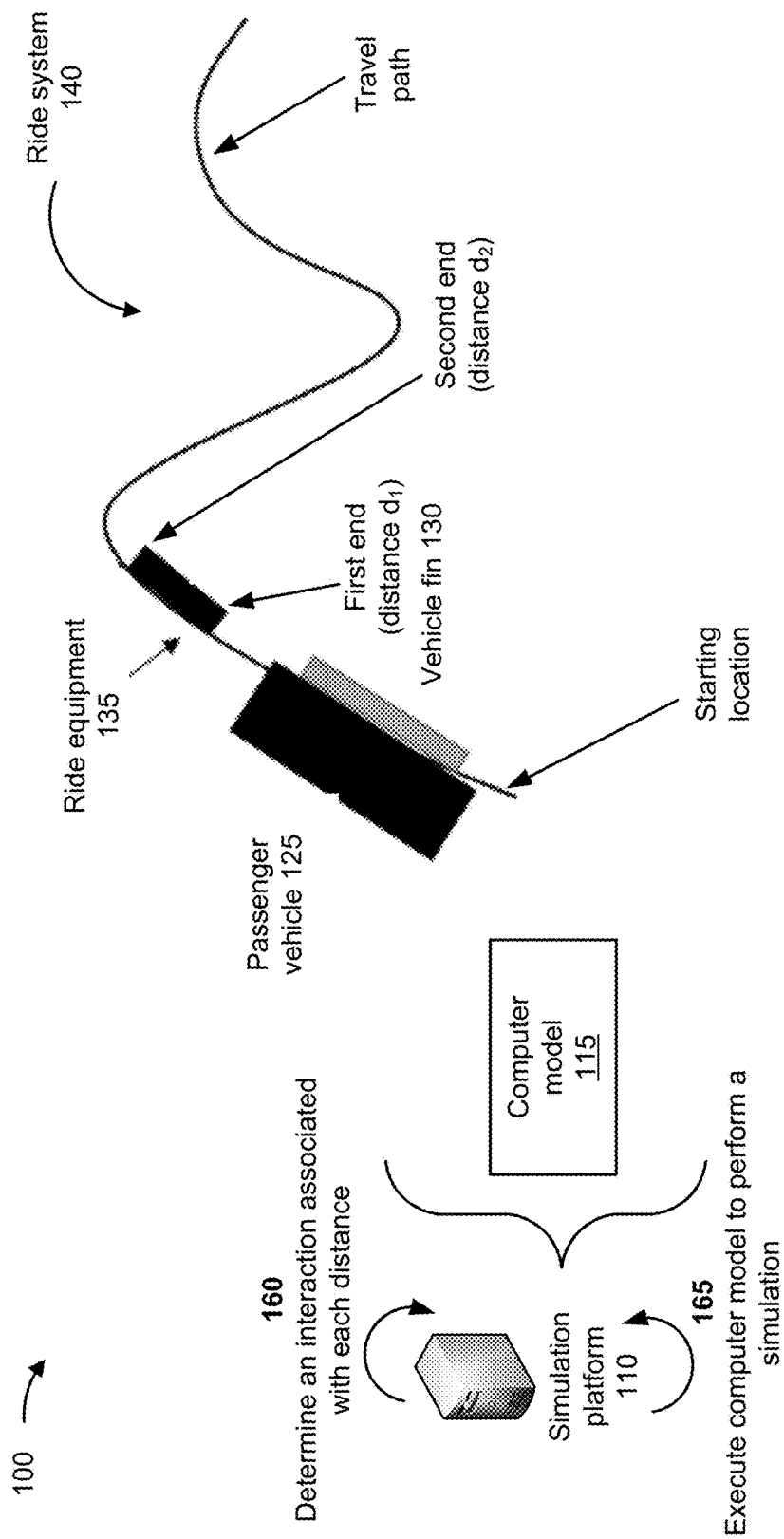

As shown in FIG. 1C, and by reference number 160, simulation platform 110 may determine an interaction associated with each distance. For example, simulation platform 110 may determine that passenger vehicle 125 will not interact with ride equipment 135 until passenger vehicle 125 has traveled the first distance from the starting location. Conversely, simulation platform 110 may determine that passenger vehicle 125 will start interacting with ride equipment 135 when passenger vehicle 125 has traveled the first distance from the starting location.

For instance, simulation platform 110 may determine that passenger vehicle 125 (e.g., a front end of passenger vehicle 125) will be interacting with the first end of ride equipment 135 when passenger vehicle 125 has traveled the first distance from the starting location. In other words, after traveling the first distance from the starting location, the front end of passenger vehicle 125 will be located at the first interaction location (and will start crossing ride equipment 135).

Simulation platform 110 may determine that passenger vehicle 125 will continue interacting with ride equipment 135 until passenger vehicle 125 has traveled the second distance from the starting location. For instance, simulation platform 110 may determine that passenger vehicle 125 will continue interacting with ride equipment 135 until passenger vehicle 125 (e.g., a rear end of passenger vehicle 125) has traveled the second distance from the starting location. In other words, after traveling the second distance from the starting location, the rear end of passenger vehicle 125 will be located at a location beyond the second interaction location and passenger vehicle 125 will no longer be interacting with ride equipment 135.

As an example, if the length of ride equipment 135 is 5 feet long and if the first end of ride equipment 135 is located at 10 feet from the starting location, simulation platform 110 may determine that when passenger vehicle 125 has traveled 10 feet from the starting location, passenger vehicle 125 will start to interact with passenger vehicle 125. Passenger vehicle 125 will continue to interact with ride equipment 135 as passenger vehicle 125 moves across ride equipment 135 until passenger vehicle 125 has fully crossed ride equipment 135 (e.g., after passenger vehicle 125 has traveled an additional 5 feet). In the context of ride equipment 135 being a sensor device, ride equipment 135 may detect a presence of passenger vehicle 125 when passenger vehicle 125 after passenger vehicle 125 has traveled 10 feet from the starting location.

In some implementations, simulation platform 110 may determine an amount of overlap between passenger vehicle 125 and ride equipment 135 as passenger vehicle 125 travels along the ride path. For example, simulation platform 110 may determine different amounts of overlap between the passenger vehicle and the ride equipment based on the passenger vehicle being located at different distances from the starting location. For instance, simulation platform 110 may determine that passenger vehicle 125 and ride equipment 135 do not overlap until passenger vehicle 125 has traveled the first distance from the starting point.

Simulation platform 110 may determine that when passenger vehicle 125 (e.g., the front end of passenger vehicle 125) is located at the first end of ride equipment 135, the amount of overlap may be the first amount of overlap. The first amount of overlap may correspond to a portion of the length of ride equipment 135 (e.g., portion of the length of ride equipment 135 corresponding to the first end).

As passenger vehicle 125 continues to travel towards the second end of ride equipment 135, the amount of overlap may increase towards the second amount of overlap. When passenger vehicle 125 (e.g., the front end of the passenger vehicle) is located at the second end of ride equipment 135, the amount of overlap may be the second amount of overlap. The second amount of overlap may correspond to an entirety of the length of ride equipment 135.

As an example, if the length of ride equipment 135 is 5 feet long and the length of passenger vehicle 125 is 2 feet long, as passenger vehicle 125 starts travel along the ride path from the starting location, the amount of overlap between ride equipment 135 and passenger vehicle 125 is initially 0.

As passenger vehicle 125 continues to travel along the ride path and reaches the first end of ride equipment 135 (e.g., the first interaction location), the amount of overlap may be greater than 0. The amount of overlap may increase to 2 feet (e.g., the maximum amount of overlap) and remain at 2 feet while the entirety of the length of passenger vehicle 125 is overlapping with ride equipment 135.

As passenger vehicle 125 starts to move away from ride equipment 135 (e.g., as the front end is moves beyond the first end of ride equipment 135), the amount of overlap may decrease towards 0. The amount of overlap may be 0 when the rear end of passenger vehicle 125 is beyond the second end of ride equipment 135 (e.g., beyond the second interaction location). In the context of ride equipment 135 being the braking equipment, the amount of overlap may be used to determine an amount of force being applied by the braking equipment to passenger vehicle 125.

In some implementations, simulation platform 110 may store overlap information identifying the different amounts of overlap. The overlap information may be stored in one or more memories associated with simulation platform 110. In some examples, simulation platform 110 may implement an overlap function that is used to determine the amount of force based on the amounts of overlap identified by the overlap information.

As shown in FIG. 1C, and by reference number 165, simulation platform 110 may execute computer model 115 to perform a simulation. For example, simulation platform 110 may execute computer model 115 after determining the interaction locations, after determining the distances from the starting point to the interaction locations, and after determining the interaction associated with each of the distances. Simulation platform 110 may execute computer model 115 to simulate a movement of passenger vehicle 125 along the ride path. In some situations, simulation platform 110 may execute computer model 115 based on a request from client device 120.

Figure 1D:
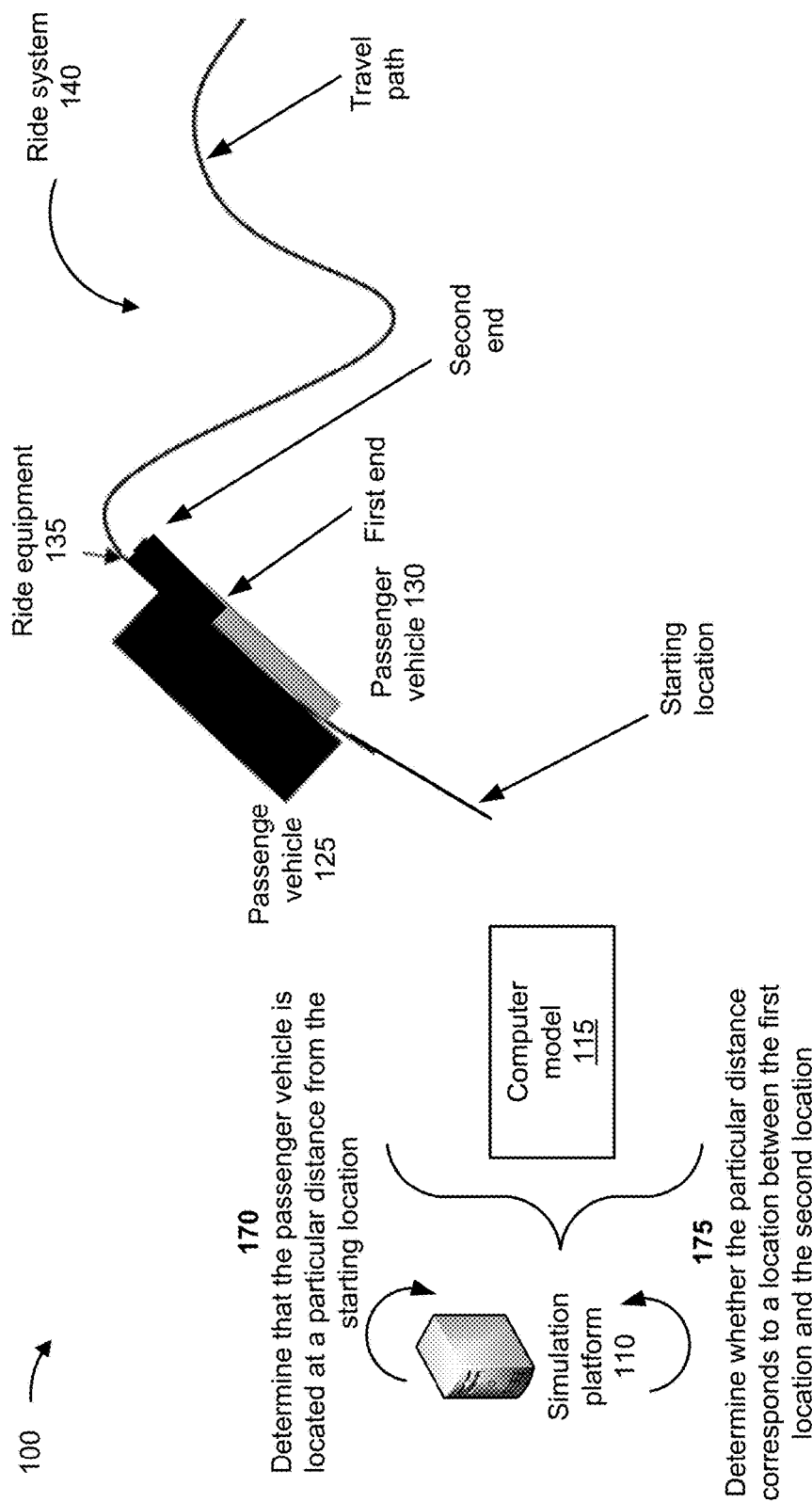

As shown in FIG. 1D, and by reference number 170, simulation platform 110 may determine that the passenger vehicle is located at a particular distance from the starting location. For example, after initiating the simulation, simulation platform 110 (e.g., via computer model 115) may monitor the movement of passenger vehicle 125 to determine whether passenger vehicle 125 has traveled to an interaction location.

In this regard, simulation platform 110 (e.g., via computer model 115) may monitor a distance traveled by passenger vehicle 125. In some examples, simulation platform 110 may determine the distance based on a velocity of passenger vehicle 125. For example, based on the velocity of passenger vehicle 125 and based on passenger vehicle 125 starting to travel from the starting location, simulation platform 110 may determine that passenger vehicle 125 has a traveled the particular distance from the starting location.

As shown in FIG. 1D, and by reference number 175, simulation platform 110 may determine whether the particular distance corresponds to a location between the first location and the second location. For example, simulation platform 110 (e.g., via computer model 115) may determine whether the particular distance is between the first distance ($d_1$) and the second distance ($d_2$). In some examples, simulation platform 110 may obtain information identifying the first distance and information identifying the second distance from the one or more memories. Simulation platform 110 may compare the particular distance and the first distance and may compare the particular distance and the second distance.

Based on the comparison, if simulation platform 110 determines that the particular distance is less than the first distance (e.g., the front end has not reached the first interaction location) or greater than the second distance (e.g., the rear end is beyond the second interaction location), simulation platform 110 may determine that the particular distance does not correspond to the location between the first location and the second location.

Alternatively, based on the comparison, if simulation platform 110 determines that the particular distance is equal to or greater than the first distance (e.g., the front end has reached the first interaction location) and that the particular distance is less than or equal to the second distance (e.g., the rear end is beyond the second interaction location), simulation platform 110 may determine that the particular distance corresponds to the location between the first location and the second location.

Figure 1E:
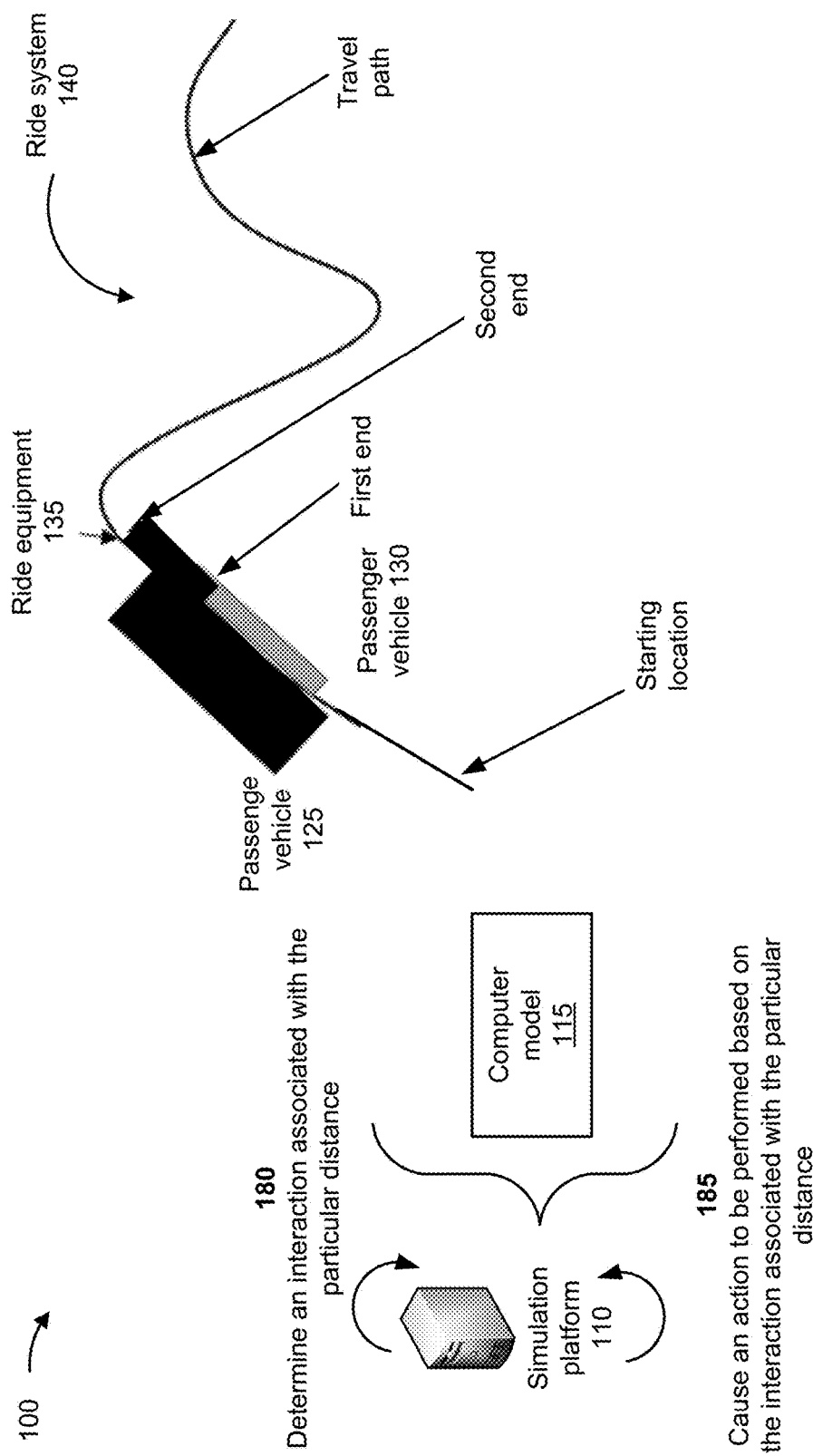

As shown in FIG. 1E, and by reference number 180, simulation platform 110 determine an interaction associated with the particular distance. For example, if simulation platform 110 determines that the particular distance does not correspond to the location between the first location and the second location, simulation platform 110 may determine that passenger vehicle 125 is not interacting with ride equipment 135.

Alternatively, if simulation platform 110 determines that the particular distance corresponds to the location between the first location and the second location, simulation platform 110 may determine that passenger vehicle 125 is interacting with ride equipment 135. For example, simulation platform 110 may determine that the front end is located at the first interaction location, that the front end is located between the first interaction location and the second interaction location, or that the rear end is located at the second interaction location.

In the context of ride equipment 135 being the sensor device, simulation platform 110 (e.g., via computer model 115) may determine that ride equipment 135 is detecting a presence of passenger vehicle 125 when the travel distance corresponds to the location between the first location and the second location. Alternatively, in the context of ride equipment 135 being the braking equipment, simulation platform 110 may determine the amount of overlap corresponding to the particular distance. Simulation platform 110 may determine the amount of overlap based on the length of passenger vehicle 125 and the length of ride equipment 135, as explained above. Based on the amount of overlap, simulation platform 110 may determine an amount of force that is to be applied by the braking equipment to passenger vehicle 125. For example, simulation platform 110 may use the overlap function to determine the amount of braking force based on the amount of overlap.

As shown in FIG. 1E, and by reference number 185, simulation platform 110 may cause an action to be performed based on the interaction associated with the particular distance. For example, simulation platform 110 may cause the action to be performed during the simulation to simulate the interaction between passenger vehicle 125 and ride equipment 135. For example, if simulation platform 110 determines that the interaction involves ride equipment 135 detecting the presence of passenger vehicle 125, simulation platform 110 may provide (as an input to computer model 115) information indicating that ride equipment 135 is to detect the presence of passenger vehicle 125. Based on the input, computer model 115 may simulate the sensor device detecting passenger vehicle 125.

Alternatively, if simulation platform 110 determines that the interaction involves ride equipment 135 applying an amount of force to vehicle fin 130, simulation platform 110 may provide (as an input to computer model 115) information indicating that ride equipment 135 is to the amount of force to vehicle fin 130. Based on the input, computer model 115 may simulate the braking equipment applying the amount of force to vehicle fin 130 of passenger vehicle 125 to decrease a velocity of passenger 125. Applying the amount of force is an example of a pre-computed complex calculation. Typically, such an interaction would require thousands of complex computations (or calculations) that would take place. In contrast, implementations described herein allows these computations to be precomputed and provided to computer model 115 as an input based on information regarding the one-dimensional distance traveled by passenger vehicle 125.

By moving the complex calculations to before or at a beginning of the simulation, an execution time of the simulation may be decreased. In other words, the execution time is improved as a result of a speed of the execution time being increased. Particularly, when using iterative analysis on a simulation, significant amounts of computation time may be preserved by moving the complex calculations to before or at a beginning of the simulation.

By reducing the three-dimensional complexity down to a single dimension and moving the calculations to the beginning of the simulation, computationally expensive calculations are performed only once. Accordingly, the simulation may be executed in expedited, thereby enabling studies (regarding the ride system) to be performed in an expedited manner. Implementations described herein provide a single-threaded solution during startup of the simulation which allows the simulation to be repeatable because race conditions commonly associated with parallel processing are removed.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
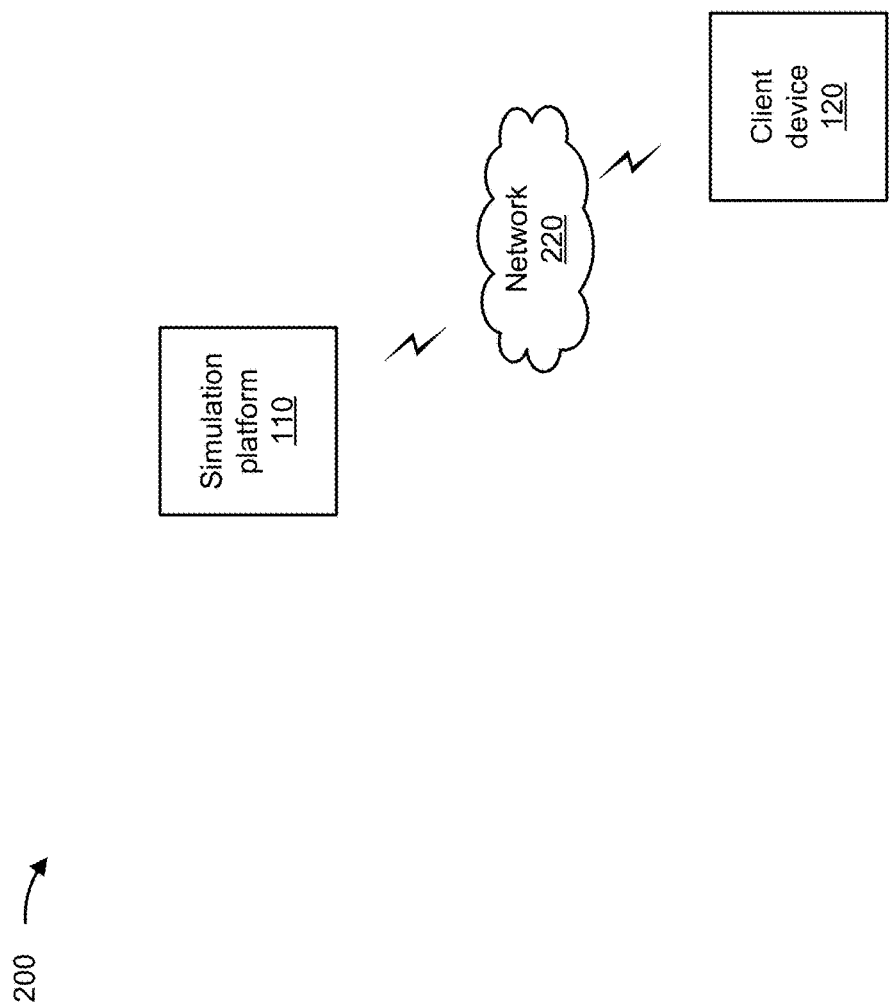
FIG. 2 is a diagram of an example environment in which systems and/or methods described herein may be implemented.

FIG. 2 is a diagram of an example environment 200 in which systems and/or methods described herein may be implemented. Some elements of environment 200 have been described above in connection with FIG. 1. In some implementations, simulation platform 110 may include one or more elements of and/or may execute within a cloud computing system. As further shown in FIG. 2, environment 200 may include simulation platform 110, client device 120, and/or a network 220. Devices and/or elements of environment 200 may interconnect via wired connections and/or wireless connections.

In some situations, simulation platform 110 may include a server, such as an application server, a client server, a web server, a database server, a host server, a proxy server, a virtual server (e.g., executing on computing hardware), or a server in a cloud computing system. In some implementations, simulation platform 110 includes computing hardware used in a cloud computing environment.

Client device 120 includes one or more devices capable of receiving, generating, storing, processing, and/or providing information associated with reducing delays associated with simulating interactions between objects, as described elsewhere herein. Client device 120 may include a communication device and a computing device. For example, client device 120 may include a wireless communication device, a mobile phone, a user equipment, a laptop computer, a tablet computer, a desktop computer, or a similar type of device.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
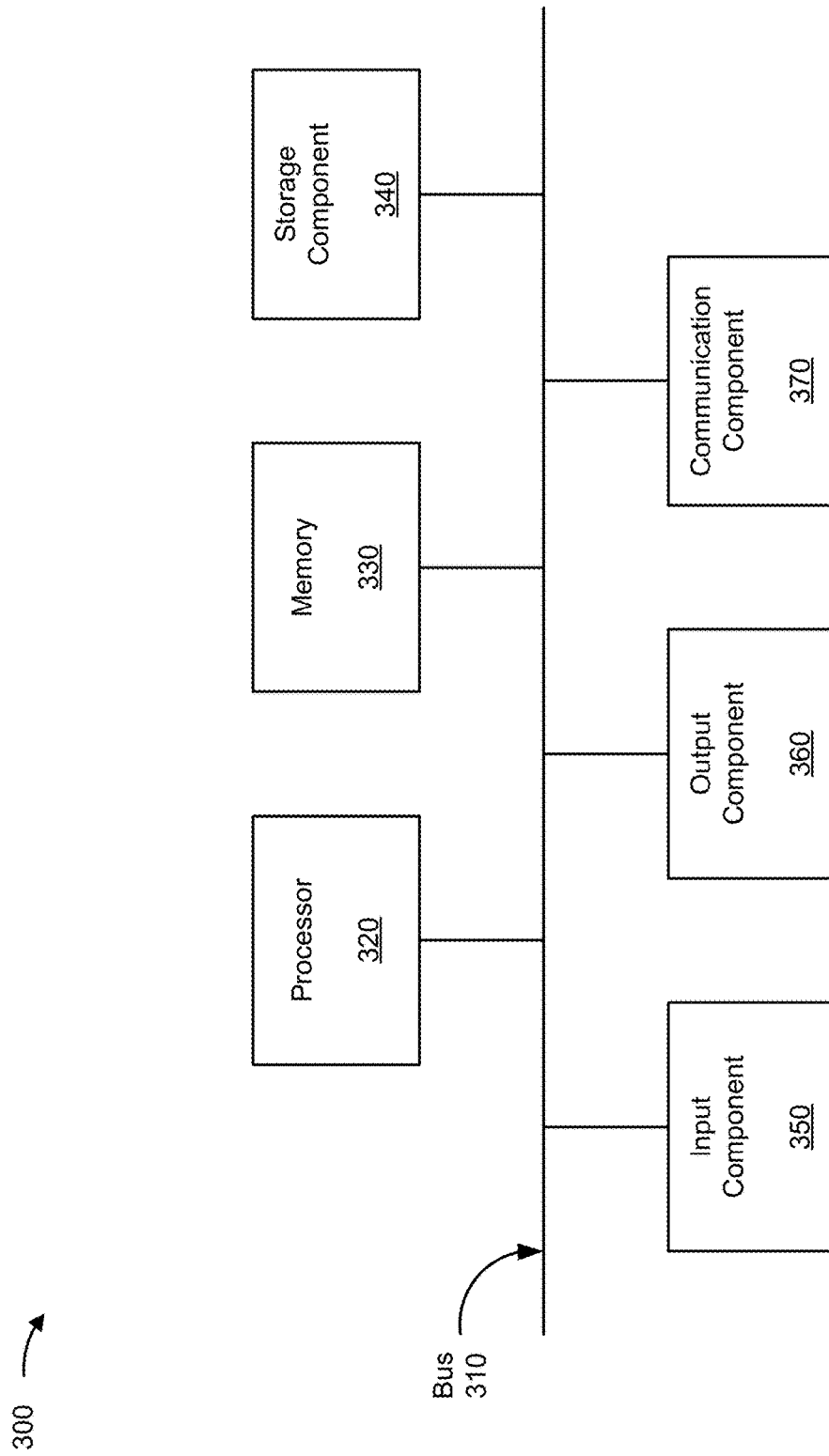
FIG. 3 is a diagram of example components of one or more devices of FIG. 2.

FIG. 3 is a diagram of example components of a device 300, which may correspond to simulation platform 110 and/or client device 120. In some implementations, simulation platform 110 and/or client device 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with systems and methods for pre-calculating information regarding interactions between objects during a simulation. In some implementations, one or more process blocks of FIG. 4 may be performed by a simulation platform (e.g., simulation platform 110). In some implementations, one or more process blocks of FIG. 4 may be performed by another device or a group of devices separate from or including the simulation platform, such as a client device (e.g., client device 120). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving equipment information regarding ride equipment of a ride system, wherein the equipment information identifies a first location of a first end of the ride equipment on a travel path of the ride system and identifies a second location of a second end of the ride equipment on the travel path (block 410). For example, the simulation platform may receive equipment information regarding ride equipment of a ride system, wherein the equipment information identifies a first location of a first end of the ride equipment on a travel path of the ride system and identifies a second location of a second end of the ride equipment on the travel path, as described above. In some implementations, the equipment information identifies a first location of a first end of the ride equipment on a travel path of the ride system and identifies a second location of a second end of the ride equipment on the travel path.

As further shown in FIG. 4, process 400 may include determining, based on the equipment information, that the first location is at a first distance from a starting location on the travel path and indicates that the second location is at a second distance from the starting location on the travel path (block 420). For example, the simulation platform may determine, based on the equipment information, that the first location is at a first distance from a starting location on the travel path and indicates that the second location is at a second distance from the starting location on the travel path, as described above.

As further shown in FIG. 4, process 400 may include executing a computer model to perform a simulation of a movement of a passenger vehicle along the travel path of the ride system (block 430). For example, the simulation platform may execute a computer model to perform a simulation of a movement of a passenger vehicle along the travel path of the ride system, as described above.

As further shown in FIG. 4, process 400 may include determining, during the simulation, that the passenger vehicle is located at a particular distance from the starting location on the travel path (block 440). For example, the simulation platform may determine, during the simulation, that the passenger vehicle is located at a particular distance from the starting location on the travel path, as described above.

As further shown in FIG. 4, process 400 may include determining whether the particular distance corresponds to a location between the first location and the second location (block 450). For example, the simulation platform may determine whether the particular distance corresponds to a location between the first location and the second location, as described above.

As further shown in FIG. 4, process 400 may include causing an action to be performed, during the simulation, based on determining whether the particular distance corresponds to the location between the first location and the second location (block 460). For example, the simulation platform may cause an action to be performed, during the simulation, based on determining whether the particular distance corresponds to the location between the first location and the second location, as described above.

Process 400 may include additional implementations, such as any single implementation or any combination of implementations described below and/or in connection with one or more other processes described elsewhere herein.

In a first implementation, process 400 includes determining overlap information indicating different amounts of overlap between the passenger vehicle and the ride equipment based on the passenger vehicle being located at different distances from the starting location on the travel path, wherein the overlap information is determined prior to executing the computer model or determined prior to determining that the passenger vehicle is located at the particular distance, determining, based on the overlap information and the particular distance, an amount of overlap between the passenger vehicle and the ride equipment, and causing the action to be performed, during the simulation, based on the amount of overlap.

In a second implementation, the ride equipment is braking equipment, and wherein causing the action to be performed comprises determining an amount of braking force corresponding to the amount of overlap, and causing the amount of braking force to be applied to the passenger vehicle during the simulation.

In a third implementation, the ride equipment is a sensor device, and wherein causing the action to be performed comprises detecting a presence of the passenger vehicle at the first location or at the second location based on the amount of overlap, and providing an indication that the passenger vehicle has been detected at the first location or at the second location.

In a fourth implementation, causing the action to be performed comprises determining that the particular distance corresponds to the location between the first location and the second location, determining that the passenger vehicle is interacting with the ride equipment based on determining that the particular distance corresponds to the location between the first location and the second location, and causing the action to be performed based on determining that the passenger vehicle is interacting with the ride equipment, wherein the action indicates that the passenger vehicle is interacting with the ride equipment.

In a fifth implementation, causing the action to be performed comprises determining that the particular distance does not correspond to the location between the first location and the second location, determining that the passenger vehicle is not interacting with the ride equipment based on determining that the particular distance does not correspond to the location between the first location and the second location, and causing the action to be performed to indicate that the passenger vehicle is not interacting with the ride equipment.

In a sixth implementation, executing the computer model to perform the simulation comprises executing the computer model to perform the simulation after determining that the first location is at the first distance and that the second location is at the second distance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a simulation platform, the method comprising:
    receiving equipment information regarding ride equipment of a ride system,
        wherein the equipment information identifies a first location of a first end of the ride equipment on a travel path of the ride system and identifies a second location of a second end of the ride equipment on the travel path;
    determining, based on the equipment information, that the first location is at a first distance from a starting location on the travel path and that the second location is at a second distance from the starting location on the travel path;
    executing a computer model to perform a simulation of a movement of a passenger vehicle along the travel path of the ride system;
    determining, during the simulation, that the passenger vehicle is located at a particular distance from the starting location on the travel path;
    determining whether the particular distance corresponds to a location between the first location and the second location; and
    causing an action to be performed, during the simulation, based on determining whether the particular distance corresponds to the location between the first location and the second location.

2. The method of claim 1, further comprising:
    determining overlap information indicating different amounts of overlap between the passenger vehicle and the ride equipment based on the passenger vehicle being located at different distances from the starting location on the travel path,
        wherein the overlap information is determined prior to executing the computer model or determined prior to determining that the passenger vehicle is located at the particular distance;
    determining, based on the overlap information and the particular distance, an amount of overlap between the passenger vehicle and the ride equipment; and
    causing the action to be performed, during the simulation, based on the amount of overlap.

3. The method of claim 2, wherein the ride equipment is braking equipment, and
    wherein causing the action to be performed comprises:
        determining an amount of braking force corresponding to the amount of overlap; and
        causing the amount of braking force to be applied to the passenger vehicle during the simulation.

4. The method of claim 2, wherein the ride equipment is a sensor device, and
    wherein causing the action to be performed comprises:
        detecting a presence of the passenger vehicle at the first location or at the second location based on the amount of overlap; and
        providing an indication that the passenger vehicle has been detected at the first location or at the second location.

5. The method of claim 1, wherein causing the action to be performed comprises:
    determining that the particular distance corresponds to the location between the first location and the second location;
    determining that the passenger vehicle is interacting with the ride equipment based on determining that the particular distance corresponds to the location between the first location and the second location; and
    causing the action to be performed based on determining that the passenger vehicle is interacting with the ride equipment,
        wherein the action indicates that the passenger vehicle is interacting with the ride equipment.

6. The method of claim 1, wherein causing the action to be performed comprises:
    determining that the particular distance does not correspond to the location between the first location and the second location;
    determining that the passenger vehicle is not interacting with the ride equipment based on determining that the particular distance does not correspond to the location between the first location and the second location; and
    causing the action to be performed to indicate that the passenger vehicle is not interacting with the ride equipment.

7. The method of claim 1, wherein executing the computer model to perform the simulation comprises:
    executing the computer model to perform the simulation after determining that the first location is at the first distance and that the second location is at the second distance.

8. A device, comprising:
    one or more processors configured to:
        determine a first location of a first end of ride equipment on a travel path of a ride system and a second location of a second end of the ride equipment on the travel path;
        determine that the first location is at a first distance from a particular position on the travel path and that the second location is at a second distance from the particular position on the travel path;
        execute a computer model to perform a simulation of a movement of a passenger vehicle along the travel path of the ride system;
        determine, during the simulation, that the passenger vehicle is located at a particular distance from the particular position after determining that the first location is at the first distance and that the second location is at the second distance;
        determine whether the particular distance corresponds to the first location or the second location; and
        cause an action to be performed, during the simulation, based on determining whether the particular distance corresponds to the first location or the second location.

9. The device of claim 8, wherein the one or more processors are further configured to:
    determine overlap information indicating different amounts of overlap between the passenger vehicle and the ride equipment based on the passenger vehicle being located at different distances from the particular position on the travel path;
    store the overlap information prior to determining that the passenger vehicle is located at the particular distance;
    determine, based on the stored overlap information and the particular distance, an amount of overlap between the passenger vehicle and the ride equipment; and
    cause the action to be performed, during the simulation, based on the amount of overlap.

10. The device of claim 9, wherein the ride equipment is braking equipment, and wherein the one or more processors, to cause the action to be performed, are configured to:
    determine an amount of braking force corresponding to the amount of overlap; and
    cause the amount of braking force to be applied to the passenger vehicle during the simulation.

11. The device of claim 10, wherein the one or more processors, to cause the action to be performed, are configured to:
    determine one or more of a velocity of the passenger vehicle or a mass of the passenger vehicle;
    determine the amount of braking force corresponding to the amount of overlap based on the at least one of the velocity or the mass; and
    cause the amount of braking force to be applied to the passenger vehicle during the simulation.

12. The device of claim 8, wherein the ride equipment is a sensor device, and
    wherein the one or more processors, to cause the action to be performed, are configured to:
    determine that the particular distance corresponds to the first location or the second location;
    detect a presence of the passenger vehicle at the first location or at the second location based on determining that the particular distance corresponds to the first location or the second location; and
    provide an indication that the passenger vehicle has been detected at the first location or at the second location.

13. The device of claim 8, wherein the one or more processors, to cause the action to be performed, are configured to:
    determine that the particular distance corresponds to the first location or the second location;
    determine that the passenger vehicle is interacting with the ride equipment based on determining that the particular distance corresponds to the first location or the second location; and
    cause the action to be performed based on determining that the passenger vehicle is interacting with the ride equipment,
        wherein the action indicates that the passenger vehicle is interacting with the ride equipment.

14. The device of claim 8, wherein the one or more processors, to cause the action to be performed, are configured to:
    determine that the particular distance does not correspond to the first location or the second location;
    determine that the passenger vehicle is not interacting with the ride equipment based on determining that the particular distance does not correspond to the first location or the second location; and
    cause the action to be performed to indicate that the passenger vehicle is not interacting with the ride equipment.

15. A non-transitory computer-readable medium storing a set of instructions, the set of instructions comprising:
    one or more instructions that, when executed by one or more processors of a device, cause the device to:
        determine a first location of a first end of ride equipment on a travel path of a ride system and a second location of a second end of the ride equipment on the travel path;
        determine that the first location is at a first distance from a particular position on the travel path and that the second location is at a second distance from the particular position on the travel path;
        execute a computer model to perform a simulation of a movement of a passenger vehicle along the travel path of the ride system;
        determine, during the simulation, that the passenger vehicle is located at a particular distance from the particular position after determining that the first location is at the first distance and that the second location is at the second distance;
        determine whether the particular distance corresponds to a location between the first location and the second location; and
        cause an action to be performed, during the simulation, based on determining whether the particular distance corresponds to the location between the first location and the second location.

16. The non-transitory computer-readable medium of claim 15, wherein the one or more instructions, that cause the device to cause the action to be performed, cause the device to:
    determine that the particular distance does not correspond to the location between the first location and the second location;
    determine that the passenger vehicle is not interacting with the ride equipment based on determining that the particular distance does not correspond to the location between the first location and the second location; and
    cause the action to be performed to indicate that the passenger vehicle is not interacting with the ride equipment.

17. The non-transitory computer-readable medium of claim 15, wherein the one or more instructions, that cause the device to cause the action to be performed, cause the device to:
    determine that the particular distance corresponds to the location between the first location and the second location;
    determine that the passenger vehicle is interacting with the ride equipment based on determining that the particular distance corresponds to the location between the first location and the second location; and
    cause the action to be performed based on determining that the passenger vehicle is interacting with the ride equipment,
        wherein the action indicates that the passenger vehicle is interacting with the ride equipment.

18. The non-transitory computer-readable medium of claim 15, wherein the one or more instructions, when executed by the one or more processors, further cause the device to:
    determine overlap information indicating different amounts of overlap between the passenger vehicle and the ride equipment based on the passenger vehicle being located at different distances from the particular position on the travel path;

store the overlap information prior to determining that the passenger vehicle is located at the particular distance;

determine, based on the stored overlap information and the particular distance, an amount of overlap between the passenger vehicle and the ride equipment; and cause the action to be performed, during the simulation, based on the amount of overlap.

19. The non-transitory computer-readable medium of claim 18, wherein the ride equipment is braking equipment, wherein the one or more instructions, that cause the device to cause the action to be performed, cause the device to:

determine an amount of braking force corresponding to the amount of overlap; and cause the amount of braking force to be applied to the passenger vehicle during the simulation.

20. The non-transitory computer-readable medium of claim 18, wherein the ride equipment is a sensor device, wherein the one or more instructions, that cause the device to cause the action to be performed, cause the device to:

determine that the particular distance corresponds to the location between the first location and the second location;

detect a presence of the passenger vehicle at the first location or at the second location based on determining that the particular distance corresponds to the location between the first location and the second location; and provide an indication that the passenger vehicle has been detected at the first location or at the second location.

* * * * *